(12) United States Patent
Schrock et al.

(10) Patent No.: US 8,028,466 B1
(45) Date of Patent: Oct. 4, 2011

(54) THWARTABLE BOTTOM LINK FOR VERTICAL LINE

(76) Inventors: Edwin B. Schrock, Brunswick, ME (US); Marilyn L. Schrock, Brunswick, ME (US)

( * ) Notice: Subject to any disclaimer, the term of this patent is extended or adjusted under 35 U.S.C. 154(b) by 372 days.

(21) Appl. No.: 12/386,585

(22) Filed: Apr. 21, 2009

(51) Int. Cl.
*A01K 69/06* (2006.01)
*A01K 69/08* (2006.01)
*A01K 97/00* (2006.01)
*A01K 69/00* (2006.01)

(52) U.S. Cl. ....... 43/43.12; 43/100; 43/17.2; 114/221 A; 441/21

(58) Field of Classification Search .............. 43/100, 43/43.12, 4, 17.2; 114/221 A; 441/2, 21
See application file for complete search history.

(56) References Cited

U.S. PATENT DOCUMENTS

| | | | | |
|---|---|---|---|---|
| 504,203 A * | 8/1893 | De Bem | ............ | 114/221 A |
| 747,114 A * | 12/1903 | Allison | ............ | 441/21 |
| 756,760 A * | 4/1904 | Wolf | ............ | 114/221 A |
| 893,173 A * | 7/1908 | Kunze | ............ | 43/17.2 |
| 2,420,987 A * | 5/1947 | Temple, Jr. | ............ | 114/221 A |
| 2,593,716 A * | 4/1952 | Allen | ............ | 43/17.2 |
| 2,755,550 A * | 7/1956 | Benjamin | ............ | 114/221 A |
| 2,968,112 A * | 1/1961 | McClure | ............ | 43/17.2 |
| 3,426,472 A * | 2/1969 | Richard | ............ | 43/100 |
| 3,621,744 A * | 11/1971 | Kelly | ............ | 83/198 |
| 3,662,634 A * | 5/1972 | Burke | ............ | 114/221 A |
| 3,724,120 A * | 4/1973 | Richard | ............ | 43/100 |
| 3,763,738 A * | 10/1973 | Temple | ............ | 114/221 A |
| 3,792,545 A * | 2/1974 | Hendrickson | ............ | 43/17.2 |
| 3,802,110 A * | 4/1974 | Guillemain | ............ | 43/17.2 |
| 3,882,748 A * | 5/1975 | Moore | ............ | 114/221 A |
| 4,034,693 A * | 7/1977 | Challenger | ............ | 43/100 |
| 4,249,277 A * | 2/1981 | Plante | ............ | 43/100 |
| 4,262,379 A * | 4/1981 | Jankiewicz | ............ | 43/100 |
| 4,373,288 A * | 2/1983 | McCrink | ............ | 43/100 |
| 4,445,295 A * | 5/1984 | Litrico | ............ | 43/100 |
| 4,463,496 A * | 8/1984 | Reich et al. | ............ | 114/221 A |

(Continued)

FOREIGN PATENT DOCUMENTS

DE 10126225 A1 * 12/2002

(Continued)

*Primary Examiner* — Darren W Ark
(74) *Attorney, Agent, or Firm* — Norman E. Lehrer

(57) ABSTRACT

A thwartable link for a vertical fishing line includes a substantially tubularly shaped body having a first end and a second end and first and second opposed side walls extending between the first and second ends. Each of the side walls has an axially extending elongated slot passing therethrough. A knife blade is located within the interior of the tubular body adjacent the first end but facing the second end. The fishing line extends through the slots in the side walls and through the interior of the tubular body. A stop is attached to the line adjacent the first side of the tubular body preventing the line from being pulled through the elongated slot in the first side. A tether extends between the second end of the tubular body and the line. The tether is connected to the line on the same side as the stop means but is spaced therefrom. An elastic O-ring surrounding the tubular body temporarily retains the line adjacent the second end of the tubular member. Applying a tensioning force on the line on the second side of the body causes the line to slide axially in the slots toward the knife blade to be severed by the knife blade. A time release device in the tether disconnects the tether from the tubular member after a pre-selected period of time.

5 Claims, 3 Drawing Sheets

U.S. PATENT DOCUMENTS

| | | | | |
|---|---|---|---|---|
| 4,569,146 A | * | 2/1986 | Lowrance et al. | 43/4 |
| 4,640,163 A | * | 2/1987 | Douglas | 114/221 A |
| 4,690,091 A | * | 9/1987 | Persbeck | 114/221 A |
| 4,778,422 A | * | 10/1988 | Saulnier et al. | 43/43.1 |
| 4,831,774 A | * | 5/1989 | Gonzalez | 43/100 |
| 5,857,881 A | * | 1/1999 | Zippel, Sr. | 43/25 |
| 5,913,670 A | * | 6/1999 | Anderson et al. | 43/43.12 |
| 5,987,710 A | * | 11/1999 | Paul et al. | 43/100 |
| 6,038,807 A | * | 3/2000 | Taylor | 43/17.2 |
| 6,261,142 B1 | * | 7/2001 | Fiotakis | 441/11 |
| 6,357,162 B1 | * | 3/2002 | Torngren | 43/17.2 |
| 6,397,948 B1 | * | 6/2002 | Williams et al. | 114/221 A |
| 6,457,896 B1 | * | 10/2002 | deDoes | 403/2 |
| 6,564,500 B1 | * | 5/2003 | Ames | 43/43.12 |
| 6,739,924 B1 | * | 5/2004 | Groen et al. | 441/21 |
| 6,779,294 B2 | * | 8/2004 | Ames | 43/43.12 |
| 6,880,290 B2 | * | 4/2005 | Mahoney | 43/100 |
| 6,928,765 B2 | * | 8/2005 | Brickett | 43/4 |
| 7,329,163 B2 | * | 2/2008 | Brickett | 114/221 A |
| 7,487,614 B1 | * | 2/2009 | Walker et al. | 43/10 |
| 7,607,252 B1 | * | 10/2009 | Lorentz | 43/100 |
| 7,743,597 B2 | * | 6/2010 | Shnayder et al. | 43/43.12 |
| 2004/0200126 A1 | * | 10/2004 | Ames | 43/43.12 |
| 2005/0150152 A1 | * | 7/2005 | Holy | 43/100 |

FOREIGN PATENT DOCUMENTS

| | | | |
|---|---|---|---|
| FR | 2848066 A1 | * | 6/2004 |
| FR | 2848067 A1 | * | 6/2004 |
| GB | 2178932 A | * | 2/1987 |

\* cited by examiner

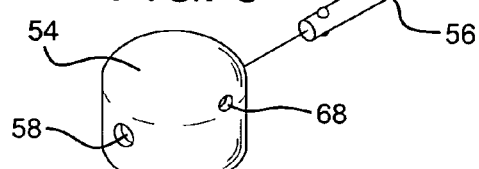
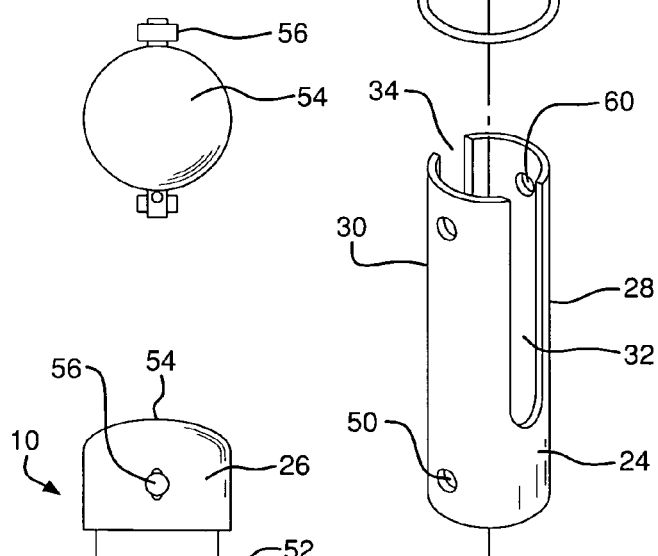
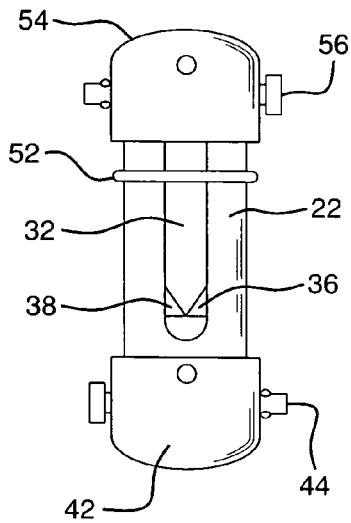
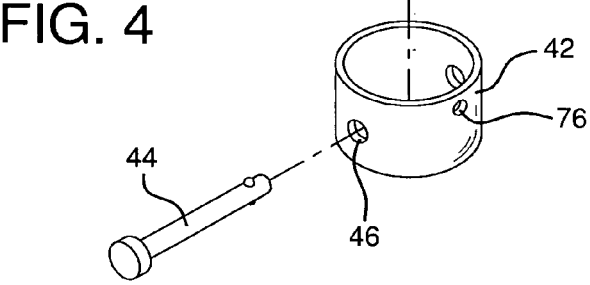
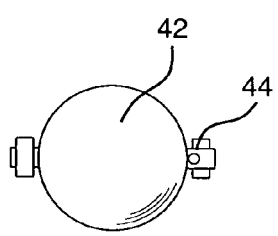

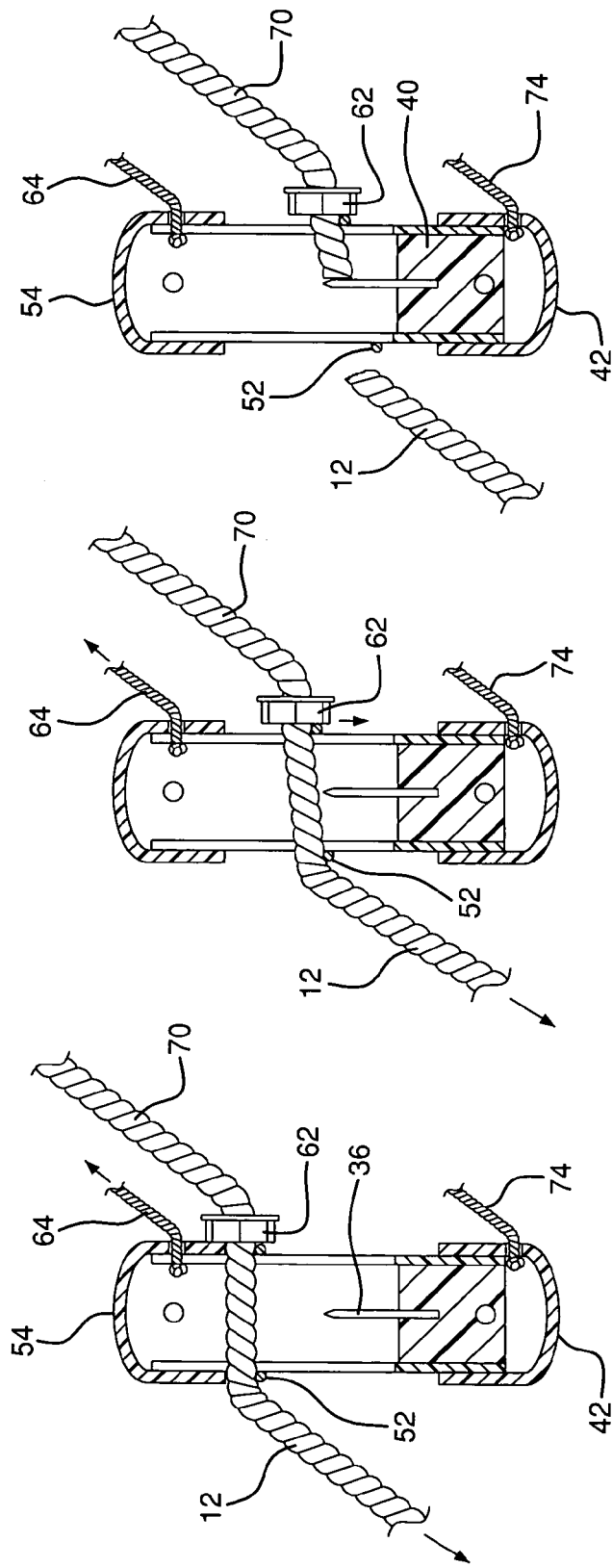

THWARTABLE BOTTOM LINK FOR VERTICAL LINE

BACKGROUND OF THE INVENTION

The present invention is directed toward a thwartable link for a vertical line and more particularly, toward a thwartable or breakaway link that severs a vertical line from a series of lobster traps in order to prevent injury to a whale that may come in contact with the line.

In the commercial lobstering business, it is common practice to connect a plurality of lobster traps together utilizing a series of ropes. The lobster traps are baited, dropped to the bottom of the seabed from a fishing boat and left for several days before they are retrieved by the lobster fishermen. The position of the traps at sea is marked by a buoy connected by a rope to the first trap in the series. This rope, commonly referred to as a vertical line extends vertically upwardly from the trap to the buoy which may be a distance of one to several hundred feet. Alternatively, two buoys are sometimes used that are spaced apart from each other with the first buoy tied to the first trap in the series by a first vertical line and the second buoy tied to the last trap in the series by a second vertical line.

After the traps have been set and left for several days, the fishing boat returns and identifies its traps by its unique buoy. The traps are retrieved by pulling the vertical line upwardly onto the boat. Since the traps are tied to the vertical line, they are also pulled upwardly onto the boat. Lobsters are removed from the traps and the process is repeated.

Unfortunately, the commercial interest in keeping the traps coupled to their associated surface buoys or other markers through vertical lines can run counter to environmental interest. In particular, it is known that whales, such as the endangered right whale, come in contact with vertical lines and other man-made components of fishing equipment, occasionally with undesired outcomes. Under the 1995 Marine Mammal Protection Act, legislation was enacted to mandate that there would be no right whale deaths occurring from interaction with commercial fishing equipment. Contemplated steps for achieving that goal have included the closure of important fishing areas for extended periods of time as well as unspecified significant modifications to fishing equipment. Either option would adversely impact the commercial fishing industry, without the certainty of solving the problem. That is, the mechanism of whale entanglement with fishing equipment is unclear and therefore the existing proposed solutions may not achieve the desired goal.

It is believed that the whales may become entangled in vertical buoy lines and other equipment in the ocean by the following process. First, when they encounter such obstacles, they may move in the direction of the obstacle, such as upward along a lobster vertical line. The force of the whale's efforts pulls the buoy underwater until such time as it is captured in the whale's baleen, against a flipper, or against some other body part. As the whale moves, pulling the entire connected underwater structure with it, it likely thrashes about, becoming further entangled. This entanglement may trap the whale underwater where it drowns.

One solution devised to combat the above problem is a weak link or breakaway link. A breakaway link, as described in U.S. Pat. No. 5,913,670, is designed to be located on the unattended line. When sufficient tension is received along the line, such as the tension caused by an entangled whale, the breakaway link breaks and releases the line, allowing the whale to disentangle. The breakaway link has two major problems.

The first problem is that the tension created by reeling the line in is similar to the tension created by an entangled whale. To avoid breaking the breakaway link when reeling in the line, fishermen must locate the link close enough to the surface to reach and begin reeling in the line below the breakaway link. Often whales get caught in the line closer to the bottom of the ocean. If the line breaks only near the surface, the whales can remain entangled or become injured while disentangling even though the rope is released. The continued problem is due to the distance between the whale and the released end of the rope.

The second problem with the breakaway link is knotting. Typically, a breakaway link is some type of ring of metal. To make the link part of the unattended line, a length of rope is tied from the buoy to the link and another length of rope is tied from the link to the submerged traps. The ropes are tied to the link by making knots in the ropes. When the links break, the knots remain. Knots in the rope impede disentanglement and can cause injury to the whales. Ideally, a device should be constructed that will disengage the rope knotlessly.

A more sophisticated breakaway link is shown in U.S. Pat. No. 6,457,896 which describes a coupling that connects the buoy to the vertical line. The couple includes a notch or a reduced thickness region and may be of fixed or swivel configuration. The reduced thickness region is designed to be the primary region in contact with the connector, such as a rope. That region is designed to fail catastrophically under a selectable stress preferably greater than the stress ordinarily experienced by the coupling. For example, if the coupling is interposed between a buoy and a vertical line, the notched coupling is designed with sufficient retaining strength to remain intact when the traps are deployed and when they hauled into a boat. However, when the rope contacts a mobile underwater body, such as a whale, the strain associated with the movement of that body reaches a level that exceeds the breaking point of the coupling at the notch. At that time, the coupling breaks at the notch and the buoy is released from the rope and the lobster traps.

This solution is also unsatisfactory as it continues to suffer from the problems of the breakaway links discussed above. That is, the device is located near the buoy. As a result, the whale can still become entangled in the line under water and drown. Ideally, a device should be constructed that will disengage the rope at the bottom of an unattended line for entangled whales, but will not disengage when fishermen reel in the line.

The device shown in U.S. Pat. No. 6,928,765 attempts to solve this last problem by providing a tension activated rope severing device that is located near the bottom of the vertical line in the vicinity of the traps. However, the device shown in this patent is quite complicated. It includes a hydraulically operated damper that controls the movement of a knife blade in relation to the rope to be severed. Furthermore, it appears that there is little control over the device severing the line inadvertently when the fishermen are reeling in the line and significant tension is being applied. That is, the device may interpret the increased tension as the entanglement of a whale and sever the line.

A need, therefore, exists for a simple but effective device that is capable of releasing a vertical line from a series of lobster traps to prevent injury to whales and that is located at the bottom of the line near the traps.

SUMMARY OF THE INVENTION

The present invention is designed to overcome the deficiencies of the prior art discussed above. It is an object of the present invention to provide a simple but effective device that is capable of releasing a vertical line from a series of lobster traps to prevent injury to whales.

It is another object of the present invention to provide a simple but effective device that is capable of releasing a vertical line from a series of lobster traps to prevent injury to whales and that is located at the bottom of the line near the traps.

It is a still further object of the present invention to provide such a device that will not malfunction and will release the vertical line only when a whale comes in contact with the same.

In accordance with the illustrative embodiments demonstrating features and advantages of the present invention, there is provided a thwartable link for a vertical fishing line including a substantially tubularly shaped body having a first end and a second end and first and second opposed side walls extending between the first and second ends. Each of the side walls has an axially extending elongated slot passing therethrough. A knife blade is located within the interior of the tubular body adjacent the first end but facing the second end. The fishing line extends through the slots in the side walls and through the interior of the tubular body. A stop is attached to the line adjacent the first side of the tubular body preventing the line from being pulled through the elongated slot in the first side. A tether extends between the second end of the tubular body and the line. The tether is connected to the line on the same side as the stop means but is spaced therefrom. An elastic O-ring surrounding the tubular body temporarily retains the line adjacent the second end of the tubular member. Applying a tensioning force on the line on the second side of the body causes the line to slide axially in the slots toward the knife blade to be severed by the knife blade. A time release device in the tether disconnects the tether from the tubular member after a pre-selected period of time.

Other objects, features, and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings forms that are presently preferred; it being understood that the invention is not intended to be limited to the precise arrangements and instrumentalities shown.

FIG. 3 is a top plan view of the device of the present invention;

FIG. 4 is front elevational view thereof;

FIG. 5 is an exploded view showing the details of construction of one embodiment of the present invention;

FIG. 6 is a side elevational view thereof;

FIG. 7 is a top plan view thereof, and

FIGS. 8, 9 and 10 are cross-sectional views showing the sequence of movement of the line as it is being severed by the present invention.

DETAILED DESCRIPTION OF THE PREFERRED EMBODIMENT

Figure 1:
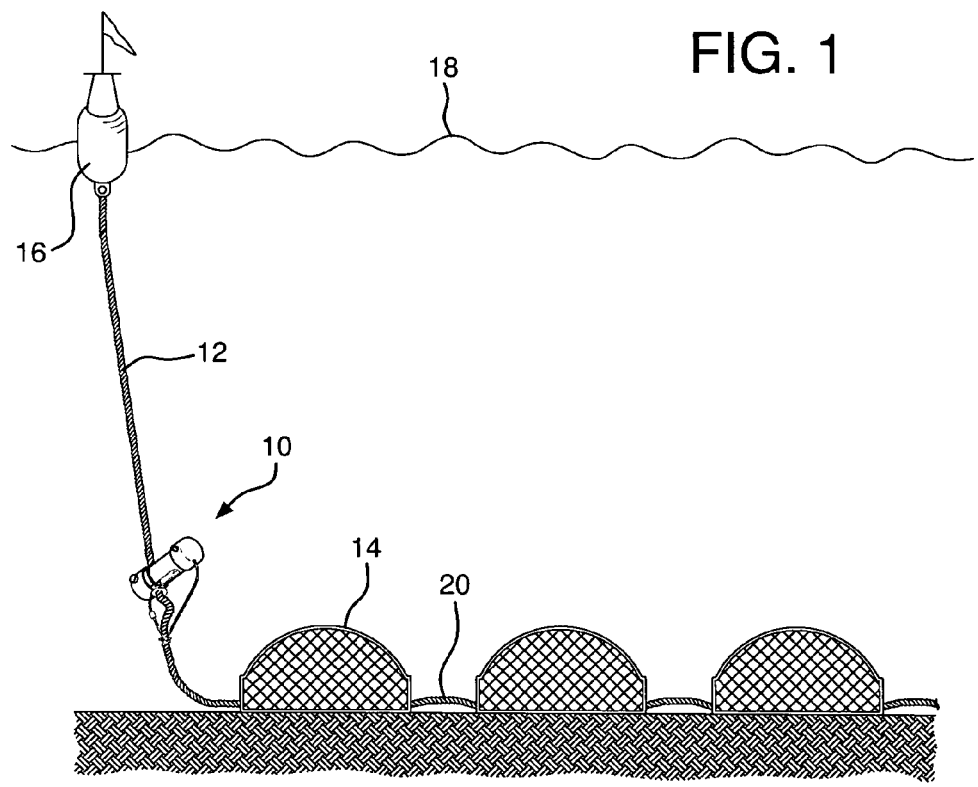
FIG. 1 is a schematic representation of a series of lobster traps connected to a buoy with the device of the present invention in the vertical line adjacent the traps.
Figure 2:
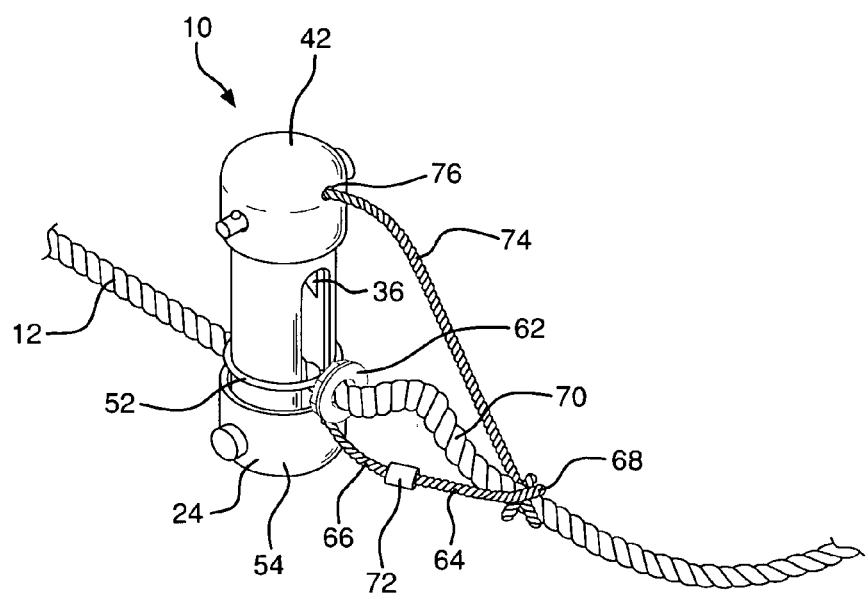
FIG. 2 is a perspective view of the present invention attached to a rope or vertical line.

Referring now to the drawings in detail wherein like reference numerals have been used throughout the various figures to designate like elements, there is shown in FIGS. 1 and 2 a thwartable link for a vertical line constructed in accordance with the principles of the present invention and designated generally as 10. FIG. 1 shows the link 10 in use in the ocean while FIG. 2 is a perspective view of the link connected to a vertical line.

As shown in FIG. 1, the link 10 of the present invention is connected to the lower end of a vertical line 12 that extends from one end of a series of lobster traps 14 to a buoy 16 floating on the surface of the ocean 18. Although only three lobster traps 14 are shown in FIG. 1, it should be readily apparent that there are normally a significant number of traps that are employed and they are connected in series through ropes 20. Depending on location, the length of the vertical line 12 may be one hundred feet or may be several hundred feet long. Furthermore, while only one vertical line 12 and one buoy 16 is shown in FIG. 1, in most installations, there will be a second vertical line and a second buoy located at the other end of the series of lobster traps 14. In this way, should the link 10 be activated and sever the vertical line 12 in the manner to be described more fully below, the lobster traps 14 can still be retrieved by the fisherman by reeling them in through the use of the second vertical line located at the other end of the series of traps.

The link 10 is comprised essentially of a substantially tubularly shaped body 22 having a first end 24 and a second end 26. First and second opposed side walls 28 and 30, respectively, extend between the first and second ends 24 and 26. Side wall 28 includes an axially extending elongated slot 32 passing therethrough while a similar axially extending elongated slot 34 is formed on the second side wall 30. The slots 32 and 34 are parallel to each other and are located 180° apart on the tubular body member 22.

The interior of the tubular body 22 is essentially hollow. Located therein adjacent the first end 24 are one or more knife blades such as shown at 36 and 38 that face toward the second end 26 of the tubular member 22. The knife blades 36 and 38 are secured to a block 40 that holds the blades in place within the interior of the body 22. A first cap 42 closes the first end 24 of the body 22 and is held in place through the use of a quick-release pin 44 that passes through aligned apertures 46, 48 and 50 in the cap 42, block 40 and tubular body 22.

An elastomeric retaining member 52 surrounds the tubular member 22 and, as is further explained below, is used to temporarily retain the vertical line in position. A second end cap 54 fits over the second end 26 of the tubular member 22 to close off the slots 32 and 34. A second quick-release pin 56 holds the second cap 54 in place through the use of apertures 58 and 60 located in the second cap 54 and the tubular member 22, respectively.

Referring again to FIGS. 1 and 2 which show the link 10 in use, in order to assemble the link onto the line 12, the second end cap 54 is removed by pulling the quick-release pin 56. The line 12 is then inserted into the elongated slots 32 and 34 and the end cap 54 is replaced. As can be seen in FIG. 2, the line 12 is located between the end cap 54 and the elastomeric ring 52. The ring 52, therefore, functions to temporarily retain the line 12 adjacent the second end 26 of the tubular member 22, away from the knife blades 36 and 38.

A stop member 62 in the form of a washer or the like is secured to the line 12 outside of the tubular member 22 on the lobster trap side of the link 10. The stop member is firmly secured to the line 12 and is larger than the width of the slot 32. Accordingly, the stop member 62 prevents the line 12 from being pulled through the center of the cylindrical body 22.

A first tether 64 in the form of a small rope or line or the like extends between the second end 24 of the tubular body 22 and the line 12, again in the direction of the lobster traps 14. The first end 66 of the tether 64 is secured to the end cap 54 by passing it through the aperture 68 (see FIG. 5) and tying a knot. The second end of the tether 64 is securely secured to the line 12 at position 68 thereon. In order to function properly, as will be described below, the length of the tether 64 must be less than the length of the line portion 70 that lies between the stop means 62 and the position 68 at which the tether 64 is secured to the line 12.

Located within the midpoint of the tether 64 is an automatic time release mechanism 72. The release mechanism 72 functions to essentially release the tether 64 by simply opening up the center thereof after a predetermined period of time which may, for example, be three to four days. The release mechanism 72 can be simply a link made of a material that decays or disintegrates after being exposed to salt water for three or four days or some other predetermined time. Such devices are commonly referred to as water soluble corrosion links. See, for example, U.S. Pat. No. 6,739,924.

Alternatively, the release mechanism 72 could be an electromechanical device operated by a timer that releases a link after a preset time. This may be, for example, a mechanism such as shown in U.S. Pat. No. 6,261,142.

Even further, in lieu of a timer, the release mechanism 72 could simply be remotely activated when desired using the arrangements shown in either U.S. Pat. No. 6,739,924 or U.S. Pat. No. 6,261,142. The subject matter of each of these patents is incorporated herein by reference.

A second tether 74 extends from the first cap 42 to the line 12. As with the first tether 64, the second tether 74 can be simply knotted to the line 12 and has its other end secured to the end cap 42 by passing it through the aperture 76 and tying a knot.

The portable link 10 described above functions in the following manner. Initially, a fisherman assembles the link 10 onto the line 12 at the proper position adjacent the lobster traps 14. The lobster traps are then lowered to the ocean floor and the buoy 16 at the upper end of the line 12 marks the proper position. Again, and as pointed out above, a second line and second buoy are located at the other end of the series of lobster traps. The lobster traps are normally left in place for three to four days. During this time period, should a whale become entangled in the vertical line 12, the line 12 will be pulled upwardly or outwardly since the stop member 62 prevents the line from being pulled through the center of the tubular body 22. The second end 24 of the link 10 is being pulled by the stop member 62 but is held in place by the tether 64 secured to the line 12 at position 68. As a result, the link 10 begins to tilt toward the vertical line 12, i.e. clockwise as shown in FIG. 2 and counterclockwise as shown in FIGS. 8, 9 and 10. As a result, the line 12 pushes against the elastomeric retaining ring 52 and starts to move through the slots 32 and 34 toward the knife blades 36. This progression is shown in FIGS. 8, 9 and 10. Eventually, sufficient force is applied so as to sever the vertical line 12 as shown in FIG. 10. The second tether 74 prevents the link 10 from being lost.

The foregoing occurs only when the tether 64 is in place. With the tether 64 removed, a vertical force on the vertical line 12 would simply pull the link 10 and the lobster traps upwardly so that they could be reeled into the fishing boat. It is for this reason that the releasing member 72 automatically disengages the tether 64 after the preset time (or on demand) which normally would be three or four days. It is at this point that the fishermen would be returning to retrieve their lobster traps.

The present invention may be embodied in other specific forms without departing from the spirit or essential attributes thereof and accordingly, reference should be made to the appended claims rather than to the foregoing specification as indicating the scope of the invention.

We claim:

1. A thwartable link for a vertical fishing line comprising:
    a substantially tubularly shaped body having a first end and a second end and first and second opposed side walls extending between said first and second ends;
    each of said side walls having an axially extending elongated slot passing therethrough;
    a knife blade within an interior of said tubularly shaped body, said knife blade being located adjacent said first end but facing said second end;
    said fishing line extending through said slots in said side walls and through the interior of said tubularly shaped body;
    stop means attached to said line adjacent said first side wall of said tubularly shaped body preventing said line from being pulled through said elongated slot in said first side wall;
    a tether extending between said second end of said tubular body and said line, said tether being connected to said line on a same side of said body as said stop means but spaced therefrom;
    means for temporarily retaining said line adjacent said second end of said tubularly shaped body;
    whereby applying a tensioning force on said line on a same side of said body as said second side wall of said body causes said line to slide axially in said slots toward said knife blade to be severed by said knife blade.

2. The thwartable link for a vertical fishing line of claim 1 wherein said means for temporarily retaining said line is comprised of an elastic member surrounding said tubular member.

3. The thwartable link for a vertical fishing line of claim 1 wherein a length of said tether is less than a length of said line from said stop member to the connection of said tether to said line.

4. The thwartable link for a vertical fishing line of claim 1 further including a time release means in said tether that disconnects said tether from said tubular member after a pre-selected period of time.

5. The thwartable link for a vertical fishing line of claim 1 including a second tether connected between said first end of said tubular member and said line.

* * * * *